US009752083B2

(12) United States Patent
Janak

(10) Patent No.: US 9,752,083 B2
(45) Date of Patent: Sep. 5, 2017

(54) METHOD OF SCAVENGING HYDROGEN SULFIDE AND/OR SULFHYDRYL COMPOUNDS

(71) Applicant: Lonza, Inc., Allendale, NJ (US)

(72) Inventor: Kevin Edward Janak, Ossining, NY (US)

(73) Assignee: Lonza, Inc., Allendale, NJ (US)

( * ) Notice: Subject to any disclaimer, the term of this patent is extended or adjusted under 35 U.S.C. 154(b) by 0 days.

(21) Appl. No.: 13/970,082

(22) Filed: Aug. 19, 2013

(65) Prior Publication Data

US 2014/0057817 A1    Feb. 27, 2014

Related U.S. Application Data

(60) Provisional application No. 61/691,567, filed on Aug. 21, 2012.

(51) Int. Cl.
| | | |
|---|---|---|
| C23F 11/14 | (2006.01) |
| C09K 8/52 | (2006.01) |
| C10G 29/24 | (2006.01) |
| C10G 29/20 | (2006.01) |
| C09K 8/532 | (2006.01) |

(52) U.S. Cl.
CPC ............. *C10G 29/24* (2013.01); *C09K 8/532* (2013.01); *C10G 29/20* (2013.01); *C09K 2208/20* (2013.01)

(58) Field of Classification Search
CPC .. C09K 8/532; C09K 2208/20; Y10S 507/932
USPC ................................................ 507/243, 932
See application file for complete search history.

(56) References Cited

U.S. PATENT DOCUMENTS

| | | | |
|---|---|---|---|
| 1,991,765 A | 2/1935 | Marks | |
| 2,426,318 A | 8/1947 | Menaul | |
| 3,035,053 A | 5/1962 | Coates et al. | |
| 3,037,978 A | 6/1962 | Coates et al. | |
| 3,459,852 A | 8/1969 | Roehm | |
| 3,664,424 A * | 5/1972 | Penberthy, Jr. | C09K 8/845 166/303 |
| 4,196,149 A | 4/1980 | Frank et al. | |
| 4,239,701 A | 12/1980 | Frank et al. | |
| 4,548,720 A | 10/1985 | Gilligan, III | |
| 4,680,127 A | 7/1987 | Edmondson | |
| 4,978,512 A | 12/1990 | Dillon | |
| 5,085,842 A | 2/1992 | Porz et al. | |
| 5,128,049 A | 7/1992 | Gatlin | |
| 5,225,103 A | 7/1993 | Hoffmann et al. | |
| 5,284,635 A | 2/1994 | Frederic | |
| 5,486,605 A | 1/1996 | Gatlin | |
| 5,498,707 A | 3/1996 | Gatlin | |
| 5,554,349 A | 9/1996 | Rivers et al. | |
| 6,663,841 B2 | 12/2003 | Salma et al. | |
| 6,942,037 B1 | 9/2005 | Arnold et al. | |
| 6,986,358 B2 | 1/2006 | Mattox et al. | |
| 7,438,877 B2 | 10/2008 | Salma et al. | |
| 2002/0157989 A1 | 10/2002 | Gatlin et al. | |
| 2004/0084186 A1* | 5/2004 | Allison | E21B 27/02 166/305.1 |
| 2009/0205659 A1 | 8/2009 | Belluzzi et al. | |
| 2010/0099596 A1 | 4/2010 | Trahan | |
| 2010/0261623 A1 | 10/2010 | Cassidy et al. | |
| 2011/0147272 A1 | 6/2011 | Karas et al. | |
| 2012/0046248 A1 | 2/2012 | Jones et al. | |

FOREIGN PATENT DOCUMENTS

| | | |
|---|---|---|
| EP | 1624089 A1 | 8/2006 |
| GB | 842593 A | 7/1960 |
| GB | 2 409 859 A | 7/2005 |
| WO | 94/00392 A1 | 1/1994 |
| WO | 9933345 A1 | 7/1999 |
| WO | 01/46553 A1 | 6/2001 |
| WO | 0208127 A1 | 1/2002 |
| WO | 02/48284 A1 | 6/2002 |
| WO | 2010027353 A1 | 3/2010 |
| WO | 2010105872 A2 | 9/2010 |

OTHER PUBLICATIONS

International Search Report for International Application No. PCT/EP2012/068592. (Dec. 17, 2012)(2 pages).

John C. Jeffery, et al., "Self assembly of a novel water soluble iron(II) macrocyclic phosphine complex from tetrakis(hydroxymethyl)phosphonium sulfate and iron(II) ammonium sulfate: single crystal X-ray structure of the complex [Fe(H2O)2{RP(CH2N(CH2PR2)CH2)2PR}]SO4—4H2O (R=CH2OH)" Chem. Commun., pp. 101-102, 2000.

Paul D. Gilbert, et al., "Tetrakishydroxymethylphosphonium Sulfate (THPS) for Dissolving Iron Sulfides Downhole and Topside—A Study of the Chemistry Influencing Dissolution", Corrosion 2002 Conference, Paper No. 02030.

Grahame N. Taylor, et al., "Gas Chromatography Mass Spectrometric Analysis of Chemically Derivatized Hexahydrotriazine-Based Hydrogen Sulfide Scavengers: 1", Ind. Eng. Chem. Res., 49, pp. 5977-5980, 2010.

Grahame N. Taylor, et al., "Gas Chromatographic-Mass Spectrometric Analysis of Chemically Derivatized Hexahydrotriazine-based Hydrogen Sulfide Scavengers: Part II", Ind. Eng. Chem. Res., 49, pp. 6267-6269, 2010.

(Continued)

*Primary Examiner* — Aiqun Li
(74) *Attorney, Agent, or Firm* — Lucas & Mercanti LLP

(57) ABSTRACT

A method of reducing the amount of sulfhydryl compounds from sour hydrocarbon fluids is described. In the method, an aldehyde-releasing compound, which is high temperature stable and is highly water-soluble, is introduced to a hydrocarbon fluid stream as a scavenger for sulfhydryl compounds. The aldehyde-releasing compound is allowed to mix with the hydrocarbon fluid stream and the aldehyde-releasing compound is allowed to react with the sulfhydryl compounds present in the hydrocarbon fluid stream, thereby reducing the presence sulfhydryl compound in the hydrocarbon fluid stream.

10 Claims, No Drawings

(56) References Cited

OTHER PUBLICATIONS

Grahame N. Taylor, et al., "Structural Elucidation of the Solid Byproduct from the Use of 1,3,5-Tris(hydroxyalkyl)hexahydro-s-triazine Based Hydrogen Sulfide Scavengers", Ind. Eng. Chem. Res., 50, pp. 735-740, 2011.

Jurgen G. E. Krauter, et al., "An Easy and Practical Synthetic Route to Electron Rich Water: Soluble Ligands: alpha-Aminomethylation of Trishydroxymethylphosphine", Tetrahedron, 56, pp. 771-774, 2000.

Jan M. Bakke, et al., "Hydrogen Sulfide Scavenging by 1,3,5-Triazinanes. Comparison of the Rates of Reaction", Ind. Eng. Chem. Res., 43, pp. 1962-1965, 2004.

Jan M. Bakke, et al., "Hydrolysis of 1,3,5-Tris(2-hydroxyethyl)hexahydro-s-triazine and Its Reaction with H2S", Ind. Eng. Chem. Res., 40, pp. 6051-6054, 2001.

Douglas E. Berning, et al., "Chemical and Biomedical Motifs of the Reactions of Hydroxymethylphosphines with Amines, Amino Acids, and Model Peptides", J. Am. Chem. Soc., 121, pp. 1658-1664, 1999.

Janne Buhaug, et al., "H2S Scavenging: Chemical Investigations of Hydroxyethyl-Triazine and Potential New Scavengers", AIChE 2002 Spring National Meeting, Trondheim, Norway.

M.K. Amosa, et al., "Sulphide Scavengers in Oil and Gas Industry—A Review", NAFTA 61(2), pp. 85-92, 2010.

International Search Report and Written Opinion for Singaporean Application No. 11201501412W Issued Jan. 5, 2016. (8 pages).

European Patent Office Communication pursuant to Rule 164(2)(b) and Article 94(3) EPC for the corresponding EP Application No. 13 756 950.5 dated Jun. 27, 2016 (10 pages).

\* cited by examiner

METHOD OF SCAVENGING HYDROGEN SULFIDE AND/OR SULFHYDRYL COMPOUNDS

CROSS-REFERENCE TO RELATED APPLICATION

This application claims priority under 35 U.S.C. §119(e) from U.S. Ser. No. 61/691,567, filed Aug. 21, 2012, entitled "Method of Scavenging Hydrogen Sulfide and/or Sulfhydryl Compounds". The disclosure of U.S. Ser. No. 61/691,567 is incorporated herein by reference in their entirety.

FIELD OF THE INVENTION

The present invention relates to a method for reducing sulfhydryl compounds from a hydrocarbon containing fluid stream.

BACKGROUND OF THE INVENTION

Hydrocarbon fluids, including liquids and gases, are found in geologic formations located below the earth's surface. Generally, these hydrocarbon fluids are mixed with other impurities that are undesirable. One of these impurities is sulfides, in particular, sulfhydryl compounds including, but not limited to hydrogen sulfide ($H_2S$). The presence of hydrogen sulfide and other sulfhydryl compounds is objectionable because these compounds may react the hydrocarbon fluid, are often corrosive, flammable, poisonous and emit a noxious odor. Due to the noxious odor, hydrocarbon fluids containing hydrogen sulfides and/or other sulfhydryl compounds are often called "sour" hydrocarbons.

The removal of hydrogen sulfide and/or other sulfhydryl compounds from liquid or gaseous industrial process streams is a challenge in a wide range of industries, particularly in the oil and gas production industry. The presence of hydrogen sulfide poses significant environmental and safety concerns to personnel and operations, and can make the hydrocarbon fluid unacceptable for commercial purposes This is due in part to the fact that hydrogen sulfide is highly flammable, highly toxic when inhaled (8 h of exposure at 100 ppm has been reported to cause death while levels of 1,000 ppm can cause death within minutes), highly corrosive, and malodorous. Further, corrosion and scale deposits resulting from the presence of hydrogen sulfide in contact with metallic surfaces, such as carbon steel pipes can further disrupt industrial operations via the plugging of pipes, valves, nozzles, and the like.

In the oil and gas industry, the removal of hydrogen is important for the transport of gas as well as the transport and storage of crude reserves in order to meet quality standards for either delivery or downstream refining. The latter is an important consideration due to sulfide poisoning of cracking catalysts. Further, in both the refining industry and geothermal power industry, cooling tower process water can contain moderate to high levels of hydrogen sulfide, both causing significant solids development, as well as increasing the level of oxidant demand so as to make oxidants unviable options for microbial control in these systems.

Nonetheless, the challenge of removing and/or reducing hydrogen sulfide and other sulfhydryl compounds from hydrocarbon streams has been addressed with a variety of different technologies. These processes are often call "sweeting" of the hydrocarbon fluid. Components added to hydrocarbon fluids to reduce or eliminate hydrogen sulfide or sulfhydryl compounds are commonly called a "scavenging agent" or a "scavenger". Common techniques utilize either absorption with a solvent or solid phase material with subsequent regeneration of the absorbent, or reaction with a suitable substance or substrate "scavenger" that produces a corresponding reaction product.

In the past, several different methods of reacting hydrogen sulfide and/or sulfhydryl compounds present in fluid streams have been used. The reaction has often involved the reaction of hydrogen sulfides with various types of aldehydes. For instance, U.S. Pat. No. 1,991,765 was an early example describing the reaction of formaldehyde with hydrogen sulfide to form an insoluble product, later identified as the sulfur heterocycle 1,3,5-trithiane. Other examples include U.S. Pat. No. 2,426,318, which discloses a method of inhibiting the corrosivity of natural gas and oil containing soluble sulfides by utilizing an aldehyde such as formaldehyde. U.S. Pat. No. 3,459,852 discloses a method for removing sulfide compounds with $\alpha,\beta$-unsaturated aldehydes or ketones such as acrolein or 3-buten-2-one (methyl vinyl ketone) as the reactive compounds. Nonetheless, both acrolein and 3-buten-2-one are hazardous, highly toxic chemicals limiting extensive use in a wider variety of applications. U.S. Pat. No. 4,680,127 describes a method for reducing $H_2S$ in a neutral to alkaline aqueous medium (pH~7-9) without the formation of solids (a problem when using formaldehyde), using glyoxal or mixtures of glyoxal and formaldehyde or glutaraldehyde. However, the glyoxal/formaldehyde mixtures exhibited slower rates of hydrogen sulfide scavenging than glyoxal alone.

Other methods of scavenging hydrogen sulfide have been described. In U.S. Pat. No. 4,978,512 describes a method where an alkanolamine and an aldehyde are reacted together to form a triazine, which is used to scavenge hydrogen sulfide. U.S. Pat. No. 5,498,707 describes a composition wherein a diamine and an aldehyde donor is used to scavenge hydrogen sulfide from liquid or gaseous process streams. U.S. Pat. No. 7,438,877 discloses a method for sulfide removal utilizing mixed triazine derivatives for improved scavenging. The mixture improves the overall scavenging capacity of triazines, but whether complete removal is achieved for a theoretically stoichiometric amount is not reported. However, it is known that typically triazines, such as hydroxyethyl triazines, do not scavenge $H_2S$ stoichiometrically (i.e., 3 mol of $H_2S$ per mol triazine) due to formation of cyclic thiazines that do not further react with $H_2S$ (Buhaug, J.; Bakke, J. M. "Chemical Investigations of Hydroxyethyl-triazine and Potential New Scavengers", *AIChE* 2002 *Spring National Meeting*).

Although multiple methods have been developed for scavenging hydrogen sulfide and/or sulfhydryl compounds from hydrocarbon fluids, including those hydrocarbon fluids from oil and gas production systems, each of these methods and compositions have drawbacks. These drawbacks include, for example, the formation of compounds that participate in aqueous environments, such as trithianes that are produced when sulfhydryl compounds are reacted with formaldehyde. In the case of triazines that release formaldehyde, these compounds also release alkyl amines which can raise the pH in the system, potentially leading to scale deposition. In addition, triazine compounds, such as the commonly used 1,3,5-tris (2-hydroxyethyl)-hexahydro-s-triazine, is considered to be highly toxic and corrosive. As such, this compound has many drawbacks.

In addition, the use of downhole injection of scavenger is limited often by either the inherent thermal and chemical instability of the scavenger, the generation of inorganic scale products due to pH changes, and/or the generation of solid by-products such as elemental sulfur, as in the case of sodium nitrite. Hence, in order to prevent problems associated with hydrogen sulfide and other sulfhydryl compounds in the production system and to improve the quality of the oil and gas produced, it is desirable to be able to use the chemical as early as possible in the production process, such as via downhole injection. There remains a need for a safe and effective means to effectively scavenge hydrogen sulfide and/or other sulfhydryl compounds from hydrocarbon fluids. Ideally, the scavenge for hydrogen sulfide should be non-hazardous, non-corrosive, biodegradable, and have a scavenging performance over a wide temperature range and pH range. The present invention provides an answer to that need.

SUMMARY OF THE INVENTION

There is provided a method of reducing the amount of sulfhydryl compounds from sour hydrocarbon fluids. In the method, an aldehyde-releasing compound, which is high temperature stable and is highly water-soluble, is introduced to a hydrocarbon fluid stream as a scavenger for sulfhydryl compounds. The aldehyde-releasing compound is allowed to mix with the hydrocarbon fluid stream and the aldehyde-releasing compound is allowed to react with the sulfhydryl compounds present in the hydrocarbon fluid stream, thereby reducing the presence sulfhydryl compound in the hydrocarbon fluid stream.

There is also provided a method for reducing sulfhydryl compounds from an oil and gas production well or injection well. In this method a high temperature stable, highly water-soluble aldehyde-releasing compound is first provided. In this method, the production well or injection well has a downhole additive addition means. This downhole is accessible from the surface via known means. The aldehyde-releasing compound is added to a production well via the downhole additive addition means during production of oil or gas from the production well.

In one particular embodiment, the aldehyde-releasing compound is a hydantoin compound.

These and other aspects will become apparent when reading the detailed description of the invention.

DETAILED DESCRIPTION OF THE PREFERRED EMBODIMENTS

It has now been surprisingly discovered that high temperature stable, water soluble aldehyde-releasing compound can be effectively used to reduce the amount of sulfhydryl compound in a hydrocarbon fluid stream. It has also been surprisingly discovered that these compound do not exhibit the drawbacks of the compounds which have been suggested to be used as sulfhydryl compound scavengers.

As used herein, the term "aldehyde-releasing compound" is intended to mean a compound with will release an aldehyde in a hydrocarbon stream.

As used herein, the term "sulfhydryl compound" is intended to include compounds having an —SH group and in intended to included compounds such as, but not limited to hydrogen sulfide ($H_2S$), organosulfur compounds a mercapto group (R—SH) (also known as thiols), thiol carboxylic acids (RCO—SH), dithio acids (RCS—SH) and other similar compounds, where R is a hydrocarbon or a substituted hydrocarbon group.

As used herein, the term "high temperature stable" means the compound is stable at temperature in excess of 80° C. for a period of time of about 6-12 hours. In some embodiments, the high temperature stable aldehyde releasing compound can be stable at temperature in excess of 100° C. or even 150° C. for period of time between 6-12 hours.

It has been discovered that aldehyde releasing compounds that are high temperature stable and water soluble may be effectively used as sulfhydryl scavengers.

In the present invention, the aldehyde-releasing compound may be any high temperature stable, water-soluble aldehyde-releasing compound. Suitable aldehyde-releasing compounds include hydantoins, imidazolidinyl ureas, dimethyloxazolidines, and glutaraldehydes. Of these compounds, hydantoins are of the most interest. Hydantoins are known in the art to be high temperature stable, safe to the environment and have been used in treating bodies of water for microbial control. As such, hydantoins are considered to be a safe alternative to other scavengers which may be toxic to the environment and those operating the production facility.

Exemplary hydantoins include, but are not limited to hydroxyalkylhydantoins, bis(hydroxyalkyl)hydantoins, and dialkylhydantoins, where the alkyl group is generally a $C_1$-$C_6$ alkyl group. Exemplary hydroxyaklyhydantoins useable as the aldehyde-releasing compound include, but are not limited to, 1-hydroxymethyl-5,5-dimethyl-hydantoin also known as monomethyloldimethylhydantoin (MDMH), 3-hydroxymethyl-5,5-dimethylhydantoin. Exemplary bis (hydroxyalkyl)hydantoins useable as the aldehyde-releasing compound include, but are not limited to, 1,3-bis(hydroxymethyl)-5,5-dimethylhydantoin as known as dimethyloldimethylhydantoin (DMDMH). Exemplary dialkylhydantoins useable as the aldehyde-releasing compound include, but are not limited to, 5,5-dimethylhydantoin. In addition, mixtures of the hydantoins may also be used.

Particular mixtures of hydantions are described in U.S. Pat. No. 5,405,862 are also useable in the present invention. The mixture of hydantoins described in U.S. Pat. No. 5,405,862 have a low free formaldehyde concentration, which helps avoid the problems mentions above regarding the use of formaldehyde. Alternatively, solid hydantoins may also be used and the solid hydantoins described in U.S. Pat. No. 5,252,744. The disclosure of each of U.S. Pat. Nos. 5,405,862 and 5,252,744 is incorporated herein by reference.

The aldehyde-releasing compound may be introduced into the hydrocarbon stream by itself, or may be introduced in a composition. Any known method of introducing the aldehyde-releasing compound into the hydrocarbon fluid stream may be used. The aldehyde-releasing compound may be a liquid composition, or a solid. It also may be part of larger composition or mixed with other ingredients used to treat the hydrocarbon fluid. For example, the aldehyde releasing composition may be part of treatment package that is added to the hydrocarbon. Other ingredients which may be part of the treatment package include, for example, corrosion inhibitors, scale inhibitors, paraffin inhibitors, hydrate inhibitors and the like. In gas production wells, the aldehyde-releasing compound should be compatible with deliquification additives and antifoamers which may be part of the additive package. The aldehyde-releasing compound should be compatible the other additives and should be non-reactive with the other additives.

Another property or advantage of the aldehyde-releasing compounds of the present invention is that they do not precipitate and thus avoid the formation of scale on the production piping, valves and other equipment used in the production of hydrocarbon fluids. Aldehyde releasing compounds, such as triazine aldehyde releasing compound which have precipitates as a by-product are not intended to be included in the aldehyde-releasing compounds of the present invention.

In one embodiment of the present invention, the aldehyde-releasing compound may be introduced into an oil and/gas production well having a downhole. Typically, hydrocarbon fluid production wells have production piping. This production piping is generally provided with a downhole additive means that allow additives to be added to the hydrocarbon fluid being produced from the production well. Downhole additive means includes, for example a capillary string, umbilical cord, a perforation in the annulus of a production pipe, addition at the backside of the production or injection well or other similar means that can effectively add an additive to the hydrocarbon fluid. Likewise, the additive may be added to an injection well in the injection fluid, or may be added at another location in the production piping. An injection well is a well that produces the hydrocarbon fluid by injecting a fluid into the well, thereby causing the hydrocarbon fluid to be expelled with the fluid being injected into the well. In one embodiment, the injection well is injected with brine and the aldehyde releasing compound is added to the brine injected into the well. In any event, in this embodiment, the aldehyde-releasing compound is placed in the hydrocarbon fluid stream of the well below the ground. By adding the aldehyde-releasing compound, the aldehyde releasing compounds are given a period of time to react with and scavenge the sulfhydryl compound from the hydrocarbon fluid.

The aldehyde-releasing compound may be added to the well or the hydrocarbon fluid stream, as a batch addition or a continuous addition. Continuous addition is generally more advantages since it promotes a continuous flow of the aldehyde-releasing compound into the hydrocarbon fluid, which allows for effective continuous control of the sulfhydryl compounds in the hydrocarbon fluid. In addition, the aldehyde-releasing compound may be added in a continuous fashion with periodic boost or batch increase to counter act an increase in the presence of the sulfhydryl compound in the hydrocarbon fluid.

In addition to be added in the downhole of a well, the aldehyde-releasing compound may be added at other locations in the production of hydrocarbon fluids. For example, the aldehyde-releasing compound may be added to the hydrocarbon fluid at the gas lift or the pump in the production system.

In another embodiment of the composition of the present invention, surfactants may also be added to aldehyde releasing compound as part of the additive to reduce sulfhydryl compounds from the hydrocarbon fluid stream. Examples of surfactants include, but are not limited to, quaternary ammonium compounds, polymers and co-polymers of ethylene oxide and propylene oxide, ethoxylated and propoxylated esters of fatty acids, fatty alkyl amine oxides, fatty acid imidazolines and betaines, and nonylphenol ethoxylates.

The quaternary ammonium compound or amine are preferably selected from the quaternary ammonium compounds having the formula $(R^1R^2R^3R^4N^+)_n X^{n-}$ wherein $R^1$, $R^2$, $R^3$, and $R^4$ are each independently an alkyl group having from 1 to 30 carbon atoms or an arylalkyl group having from 7 to 30 carbon atoms, and $X^{n-}$ is a mono- or polyvalent anion such as a halide, a $C_{2-20}$ mono- or dicarboxylate, a borate, nitrate, bicarbonate, carbonate, sulfamate, a sulfonate, sulfate, or a phosphate, and n is an integer between 1 and 4 inclusive, e.g. 1, 2 3, or 4. The alkyl groups are any linear, branched or cyclic saturated hydrocarbyl groups having the stated number of carbon atoms. Arylalkyl groups are alkyl groups substituted with an aryl group, preferably with a phenyl group, such as benzyl (phenylmethyl) or phenylethyl. The halides are generally fluorides, chlorides, bromides or iodides, preferably chlorides or bromides. $C_{2-20}$ mono-or dicarboxylates are anions derived from saturated or unsaturated mono- or dicarboxylic acids having 2 to 20 carbon atoms, such as acetate, propionate, butyrate, pentanoate, hexanoate, octanoate, decanoate, dodecanoate (laurate), tetradecanoate (myristate), hexadecanoate (palmitate), octadecanoate (stearate), oleate, linolate, oxalate, malonate, succinate, glutarate, adipate, 1,8-octanedioate, 1,10-decanedioate, 1,12-dodecanedioate and the like. Borates may be monoborates (containing the $BO_3^{3-}$ anion) or polyborates such as di-, tri-, tetra-, penta-, hexa-, or octaborates. Sulfonates may be alkanesulfonates, such as methanesulfonate or trifluoromethanesulfonate, or arenesulfonates, such as benzene- or toluenesulfonate. Sulfates may be "neutral" sulfates or "acid" sulfates (hydrogensulfates, bisulfates). Similarly, phosphates may be orthophosphates ($PO_4^{3-}$), hydrogenphosphates ($HPO_4^{2-}$) or dihydrogenphosphates ($H_2PO_4^{-}$).

The aldehyde-releasing composition is added to the hydrocarbon stream in an amount such that there is at least 0.3 moles of the aldehyde-releasing compound per mole of the sulfhydryl compound present in the hydrocarbon. The upper limit of the aldehyde-releasing compound is unlimited. Generally, more of the aldehyde-releasing compound added, the faster the sulfhydryl compound will be scavenged. The upper limit is essentially limited to the cost of the aldehyde-releasing compound to the benefit obtained. Typically, the aldehyde-releasing compound or mixtures of compounds will added to the hydrocarbon in an amount between about 1 to about 10 moles of the aldehyde releasing compound or mixture per mole of the sulfhydryl compound present in the hydrocarbon fluid. Generally, there will between about 2 and about 5 moles of the aldehyde releasing compound or mixture of compounds per mole of the sulfhydryl compound present in the hydrocarbon fluid.

Being that the aldehyde-releasing compound or mixture of compound is water-soluble as well, the aldehyde-releasing compound or mixture is also effective in treating any water that is produced from the hydrocarbon generating well. Water is often generated as an impurity of hydrocarbon production wells and water can be used as the injection fluid in injection wells. Since sulfhydryl compounds, particularly hydrogen sulfide are water soluble, the water generated by the well can contain amounts of the sulfhydryl compound, which can transfer to the hydrocarbon fluids generated by the well, thereby souring the hydrocarbon gas and liquid.

The present invention is further described in detail by means of the following Examples.

EXAMPLES

Example 1

In order to demonstrate the $H_2S$ scavenging ability of the aldehyde-releasing compound, a composition containing a mixture of dimethyloldimethylhydantoin (DMDMH) and monomethyloldimethylhydantoin (MDMH), in a ratio of about 1.35:1 was tested. The composition was tested in a gas production well in North America that produces >3,400 m$^3$ (>0.12 MMSCF) gas per day, as well as >1.6 m$^3$ (>10 bbl) of oil and >22 m$^3$ (>140 bbl) of water. The average hydrogen sulfide content is approximately 215 ppm. Hydrogen sulfide in the gas was measured upstream of the separator unit, while the scavenger was injected downhole through the annulus of the downpipe and into the well. As shown in Table 1, the efficiency of the composition of the present invention is described.

TABLE 1

| Component | Rate (gal/day) | $H_2S$ Concentration at Sample Location (ppm) |
|---|---|---|
| Untreated Control | 0 | 215 |
| Aldehyde Condensate | 6 | 60 |
| % Reduction | | 72% |

Example 2

In order to demonstrate the $H_2S$ scavenging ability of the aldehyde-releasing compound, the composition used in Example 1 was tested in a different gas production well in North America. This well produces >5.66×10$^6$ m$^3$ (>200 MCF) gas per day, as well as >48 m$^3$ (>300 bbl) of oil and >1.6 m$^3$ (>10 bbl) of water. The average hydrogen sulfide content is approximately 150 ppm for the three streams. The composition was injected in the hydrocarbon fluid stream through an injection nozzle located below the ground surface. Hydrogen sulfide in the gas was measured approximately 4,800 m (5,217 yards) from the injection point. The scavenging efficiency of the product is exemplified in Table 2.

TABLE 2

| Component | Rate (gal/day) | $H_2S$ Concentration at Sample Location (ppm) |
|---|---|---|
| Untreated Control | 0 | 150 |
| Aldehyde Condensate | 18 | 10 |
| % Reduction | | 93% |

Example 3

In order to demonstrate the $H_2S$ scavenging ability of the aldehyde-releasing compound, the composition used in Example 1 was tested in a different gas production well in North America. This well produces >5.66×10$^3$ m$^3$ (>200 MCF) gas per day, as well as >56 m$^3$ (>350 bbl) of oil and >267 m$^3$ (>1,700 bbl) of water. The average hydrogen sulfide content is approximately 36 ppm, prior to treatment. The composition was injected in the hydrocarbon fluid stream through an injection nozzle located below the ground surface. Hydrogen sulfide in the gas was measured approximately 1,600 m (1,760 yards) from the injection point. Table 3 shows the efficiency of the scavenger of the present invention.

TABLE 3

| Component | Rate (gal/day) | $H_2S$ Concentration at Sample Location (ppm) |
|---|---|---|
| Untreated Control | 0 | 36 |
| Aldehyde Condensate | 3 | 10 |
| % Reduction | | 72% |

As can be seen, a composition containing the high temperature stable aldehyde-releasing compound is effective at reducing the hydrogen sulfide content in the gas generated by each well, shown in Examples 1-3.

While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. A method for reducing the amount of sulfhydryl compounds from an oil and gas production well or injection well, said method comprising
   (i) providing a high temperature stable, highly water soluble aldehyde-releasing compound comprising hydantoins; and
   (ii) adding an effective amount of the aldehyde-releasing compound to the production well or the injection well at a position downhole and below ground surface, the aldehyde-releasing compound being added to a hydrocarbon fluid stream downhole and below ground during production of oil or gas from the production well or injection well.

2. The method according to claim 1, wherein the downhole addition, below ground surface, is achieved using a capillary string, umbilical cord, a perforation in the annulus of a production pipe, addition at the backside of the production or injection well.

3. The method according to claim 1, wherein the hydantoin comprises a hydroxymethyl hydantoin, a bis(hydroxymethyl)hydantoin or a mixture thereof.

4. The method according to claim 3, wherein the hydroxymethylhydantion is selected from the group consisting of 1-hydroxymethyl-5,5-dimethylhydantoin, 3-hydroxymethyl-5,5-dimethylhydantoin, and mixtures thereof; and the bis(hydroxymethyl)hydantoin is 1,3-bis(hydroxymethyl)-5,5-dimethylhydantoin.

5. The method according to claim 1, wherein the sulfhydryl compound present in the hydrocarbon fluid comprises hydrogen sulfide.

6. The method according to claim 1, wherein the aldehyde-releasing compound is continuously fed, below ground surface, to the production well or injection well.

7. The method according to claim 1, wherein the aldehyde-releasing compound is fed, below ground surface, to the production well or injection well in a batchwise manner.

8. The method according to claim 1, wherein the aldehyde-releasing compound is added in amount of at least 0.3 moles of the aldehyde-releasing compound per mole of the sulfhydryl present in the hydrocarbon fluid stream to be treated.

9. The method according to claim 8, wherein the aldehyde-releasing compound is added in amount between about 1 to about 10 moles of the aldehyde-releasing compound per mole of the sulfhydryl present in the hydrocarbon fluid stream to be treated.

10. The method according to claim 1, wherein the aldehyde-releasing compound is stable at a temperature of 80° C. for a period of at least 6 hours.

* * * * *